(12) United States Patent
Goff et al.

(10) Patent No.: US 8,967,548 B2
(45) Date of Patent: Mar. 3, 2015

(54) DIRECT TO FACILITY CAPTURE AND RELEASE

(71) Applicants: Jonathan Andrew Goff, Lafayette, CO (US); Michel Edward Loucks, Friday Harbor, WA (US); Kirk David Dameron, Denver, CO (US)

(72) Inventors: Jonathan Andrew Goff, Lafayette, CO (US); Michel Edward Loucks, Friday Harbor, WA (US); Kirk David Dameron, Denver, CO (US)

(73) Assignee: Altius Space Machines, Broomfield, CO (US)

( * ) Notice: Subject to any disclaimer, the term of this patent is extended or adjusted under 35 U.S.C. 154(b) by 437 days.

(21) Appl. No.: 13/706,956

(22) Filed: Dec. 6, 2012

(65) Prior Publication Data

US 2013/0140403 A1     Jun. 6, 2013

Related U.S. Application Data

(63) Continuation-in-part of application No. 13/312,984, filed on Dec. 6, 2011.

(60) Provisional application No. 61/676,917, filed on Jul. 28, 2012.

(51) Int. Cl.
| | |
|---|---|
| *B64G 1/64* | (2006.01) |
| *B64G 1/22* | (2006.01) |
| *B64G 1/24* | (2006.01) |
| B64G 1/00 | (2006.01) |

(52) U.S. Cl.
CPC ...... *B64G 1/646* (2013.01); *G05B 2219/39567* (2013.01); *G05B 2219/45085* (2013.01); *B64G 1/002* (2013.01); *B64G 1/222* (2013.01); *B64G 1/242* (2013.01)

USPC ............................................. 244/172.4

(58) Field of Classification Search
CPC ............................... B64G 1/222; B64G 1/646
USPC ............................................. 244/172.6
See application file for complete search history.

(56) References Cited

U.S. PATENT DOCUMENTS

| | | | | |
|---|---|---|---|---|
| 4,259,876 A | * | 4/1981 | Belyanin et al. | 74/469 |
| 4,657,211 A | * | 4/1987 | Fuldner et al. | 244/172.5 |
| 4,865,514 A | * | 9/1989 | Tsuchihashi et al. | 414/736 |
| 4,964,062 A | * | 10/1990 | Ubhayakar et al. | 700/249 |

(Continued)

OTHER PUBLICATIONS

Official Action for U.S. Appl. No. 13/312,984, mailed Aug. 7, 2014.

(Continued)

*Primary Examiner* — Justin Benedik
(74) *Attorney, Agent, or Firm* — Thomas J. Lavan

(57) ABSTRACT

A method for delivering a payload to a space facility is provided. The method includes detecting the relative position and velocity of a launch vehicle stage, the launch vehicle stage including the payload and one or more thrusters. The method also includes providing guidance information to the launch vehicle stage. The launch vehicle stage does not include a relative navigation system. In response to receiving the guidance information, the method further includes activating one or more thrusters corresponding to the guidance information, and guiding a capture head of a boom into capture proximity to the payload. One end of the boom is coupled to the space facility and the other end of the boom is coupled to the capture head. The method also includes capturing the payload, removing any residual relative velocity of the payload relative to the space facility, and moving the captured payload to the space facility.

20 Claims, 12 Drawing Sheets

(56) References Cited

U.S. PATENT DOCUMENTS

| | | | |
|---|---|---|---|
| 5,145,130 A | 9/1992 | Purves | |
| 5,390,288 A * | 2/1995 | Toda et al. | 700/258 |
| 5,509,707 A | 4/1996 | Schauer | |
| 6,523,784 B2 * | 2/2003 | Steinsiek et al. | 244/172.4 |
| 6,845,303 B1 * | 1/2005 | Byler | 701/13 |
| 7,168,660 B2 * | 1/2007 | Bischof et al. | 244/158.2 |
| 7,479,198 B2 | 1/2009 | Guffrey et al. | |
| 7,551,419 B2 | 6/2009 | Pelrine et al. | |
| 7,686,255 B2 * | 3/2010 | Harris | 244/159.5 |
| 7,773,363 B2 | 8/2010 | Pelrine et al. | |
| 2003/0229420 A1 | 12/2003 | Buckingham et al. | |
| 2005/0097833 A1 * | 5/2005 | Campbell et al. | 52/118 |
| 2006/0237126 A1 | 10/2006 | Guffrey et al. | |
| 2007/0040067 A1 * | 2/2007 | D'Ausilio et al. | 244/172.5 |
| 2007/0063375 A1 | 3/2007 | Tuma | |
| 2007/0164164 A1 * | 7/2007 | Cepollina et al. | 244/158.1 |
| 2008/0169003 A1 * | 7/2008 | Curtis | 134/1 |
| 2008/0237400 A1 * | 10/2008 | Gryniewski et al. | 244/172.2 |
| 2009/0166476 A1 * | 7/2009 | Termini | 244/158.6 |
| 2010/0193640 A1 * | 8/2010 | Atmur et al. | 244/158.2 |
| 2012/0076629 A1 | 3/2012 | Goff | |
| 2012/0205492 A1 * | 8/2012 | Gelon | 244/171.8 |

OTHER PUBLICATIONS

Compliant robotic devices, and electroadhesion, G. J. Monkman, Robotics research unit, Department of electronic engineering, University of Hull, Hull H46 7RX (UK), published in Robotica 1992, vol. 10, pp. 183-185, downloaded Sep. 28, 2011.

Tilted Janus polymer pillars, Myoung-Woon Moon, Tae-GonCha, Kwang-Ryeol Lee, Ashkan Vaziri, and Ho-Young Kim, www.rsc.org/softmatter.

Book: Force Control of Robotic Systems, 1997, Dmitri Gorinevsky, Alexander Formalsky, and Anatoli Schneider, CRC Press.

Smooth vertical surface climbing with directional adhesion, Sangbae Kim, Matthew Spenko, Salomon Trujillo, Barrett Heyneman, Daniel Santos, Mark R. Cutkosky, IEEE Transactions on robotics, vol. 24 No. 1, Feb. 2008.

Directional adhesion for climbing: theoretical and practical considerations, Daniel Santos, Matthew Spenko, Aaron Parness, Sangbae Kim, and Mark R. Cutkosky, Center for design and research, Stanford University, Stanford, California, 94305-2232.

Climbing rough vertical surfaces with hierarchical directional adhesion, Alan Asbeck, Sanjay Dastoor, Aaron Parness, Laurel Fullerton, Noe Esparza, Daniel Soto, Barrett Heyneman, Mark Cutkosky, Stanford University, Stanford, California, 94305.

Hierarchically branched Gecko-like structures imprinted using porous alumina templates, A. Y. Y. Ho, I. Rodriguez, Y. C. Lam, Institute of materials research and engineering, Agency for Science, Technology and research (A*STAR), 3 Research Link, Singapore 117602, School of mechanical and aerospace engineering, Nanyang technological university, NSTI-Nanotech 2010, www.nsti.org, ISBN 978-1-4398-3402-2 vol. 2, 2010.

Flexible carbon-nanofiber connectors with Anisotropic adhesion properties, Hyunhyub Ko, Zhenxing Zhang, Johnny C. Ho, Kuniharu Takei, Rehan Kapadia, Yu-Lun Chueh, Weizhen Cao, Brett A. Cruden, Ali Javey, Wiley Interscience, www.small-journal.com, Small 2009, Oct. 2, 2009, 2009 Wiley-VCH Verlag GmBH & Co., KGaA, Weinheim.

Hybrid core-multishell nanowire forests for electrical connector applications, Rehan Kapadia, Hyunhyub Ko, Yu-Lun Chueh, Johnny C. Ho, Toshitake Takahashi, Zhenxing Zhang, Ali Javey, Department of electrical engineering and computer sciences, University of California at Berkeley, Published Jul. 1, 2009, Applied Physics Letters 94, 263110 (2009), 2009 American Institute of Physics.

Wet and dry adhesion properties of self-selective nanowire connectors, Hyunhyub Ko, Zhenxing Zhang, Yu-Lun Chueh, Johnny C. Ho, Jongho Lee, Ronald S. Fearing, Ali Javey, Advanced functional Materials 2009, Published Aug. 25, 2009, 19, 3098-3 102, www.afm-journal.de, Wiley Interscience, 2009 Wiley-VCH Verlag GmBH & Co, KGaA, Weinheim.

Engineering issues for all major modes of in-situ space debris capture, Marshall H. Kaplan, Bradley Boone, Robert Brown, Thomas B. Criss, Edward W. Tunstel, John Hopkins University Applied Physics Laboratory, Laurel, Maryland, 20732, AIAA 2010-8863, AIAA Space 2010 Conference and Exposition, Aug. 30-Sep. 2, 2010, Anaheim, California.

Book: Introduction to robotics: Mechanics and Control (3rd Edition), 2005, John J. Craig, Pearson/Prentice Hall.

Book: Robot Force Control, 1999, Bruno Siciliano and Luigi Villani, Kluwer Academic Press.

Wikipedia "Lagrangian Point", http://en.wikipedia.org/wiki/Lagrangian_point, downloaded Nov. 20, 2012.

Notice of allowance for U.S. Appl. No. 13/312,984, mailed Nov. 26, 2014.

* cited by examiner

Fig. 1 Space facility orbit
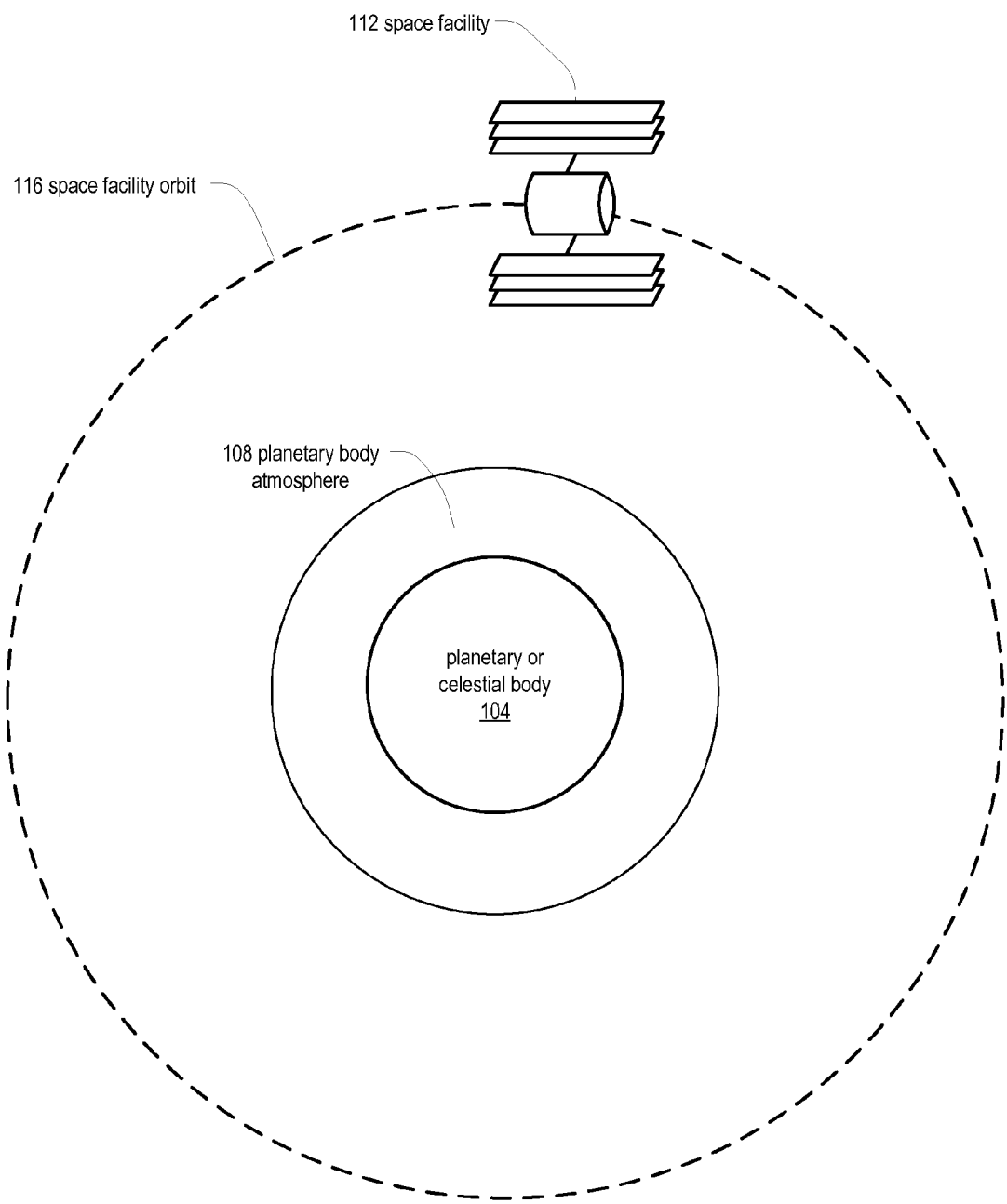

*Fig. 2   Space facility exclusion zone*
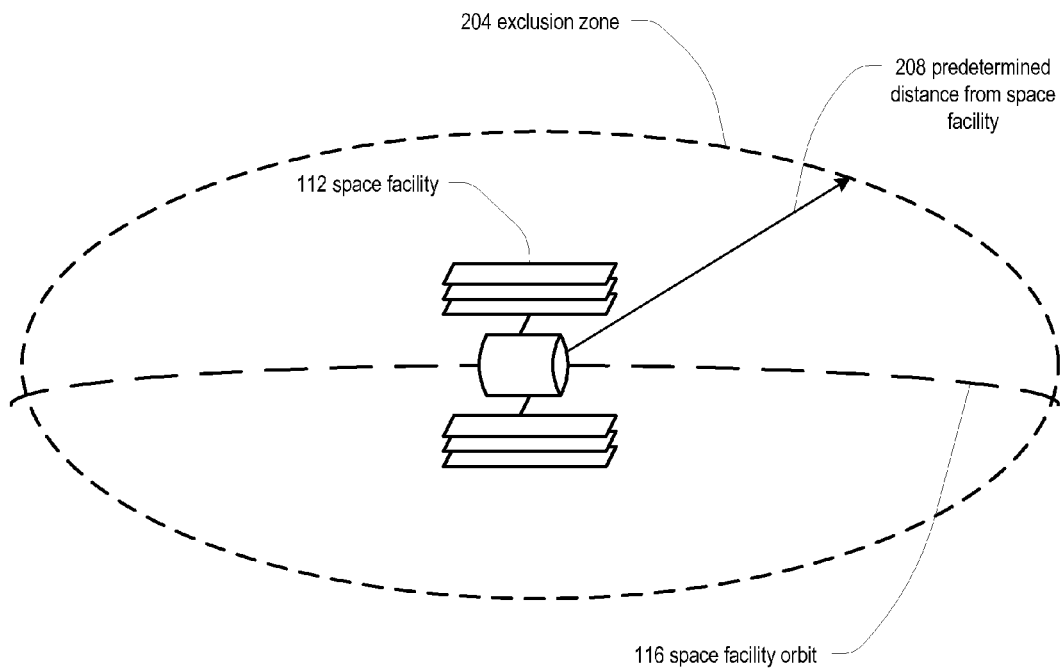
*Fig. 3   Space facility*
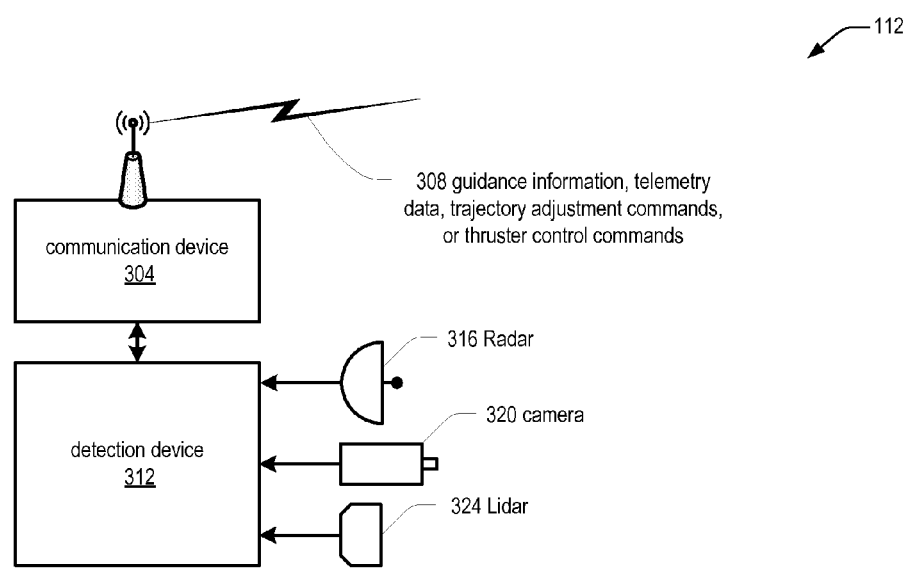

*Fig. 4a  Launch vehicle stage*
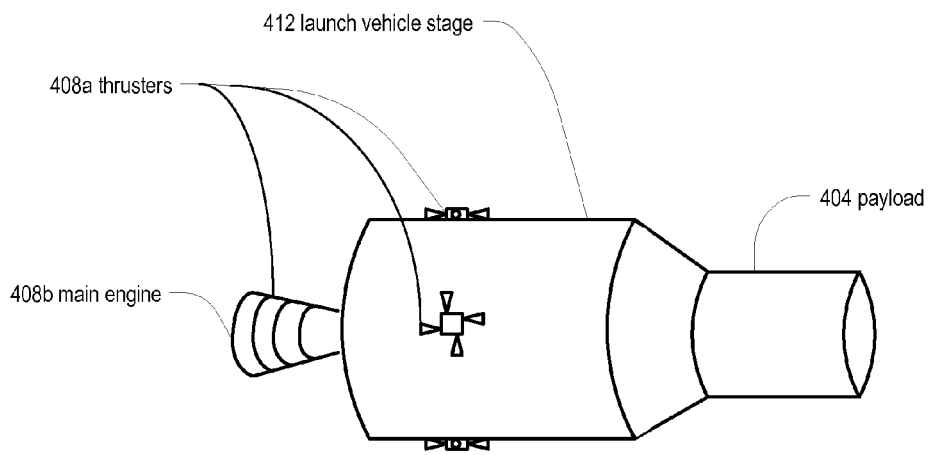
*Fig. 4b  Payload*
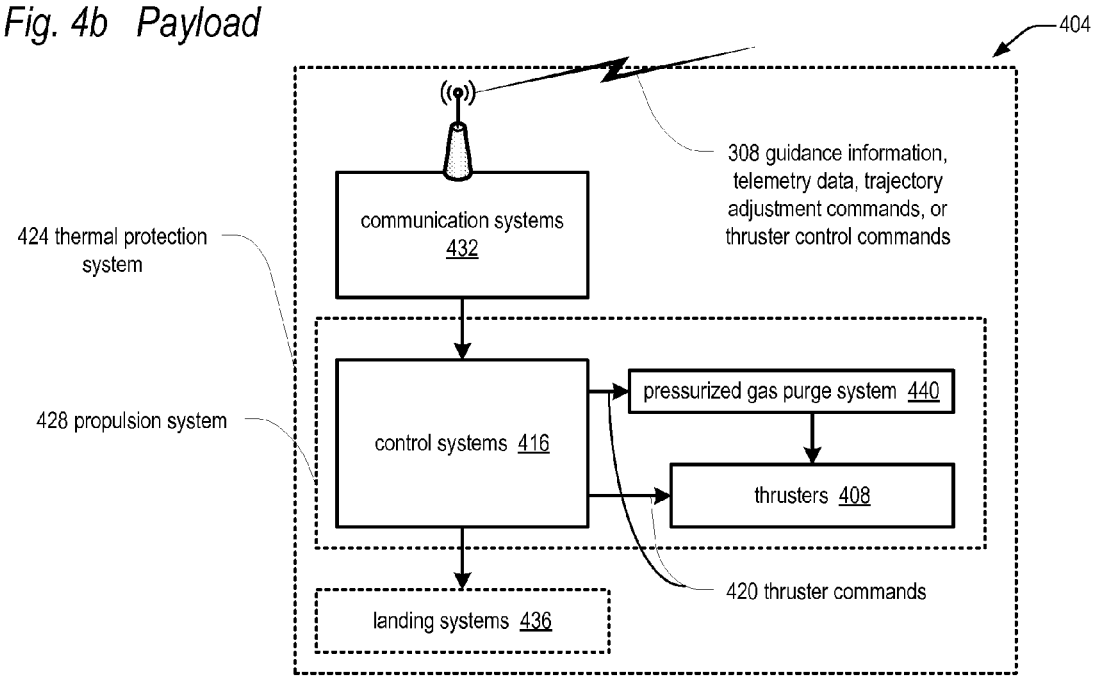

Fig. 5a  Space facility and boom
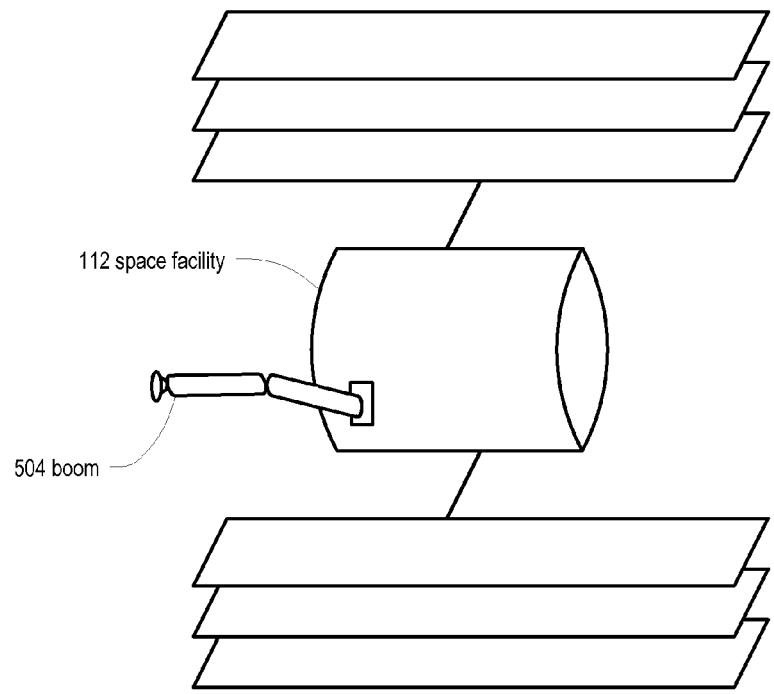
Fig. 5b  Boom
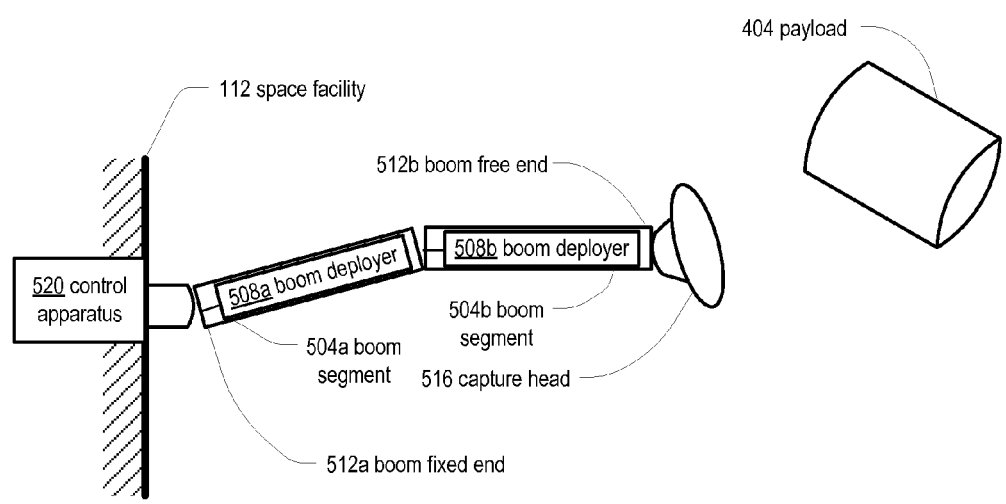

Fig. 6  *Space facility payload disposal*
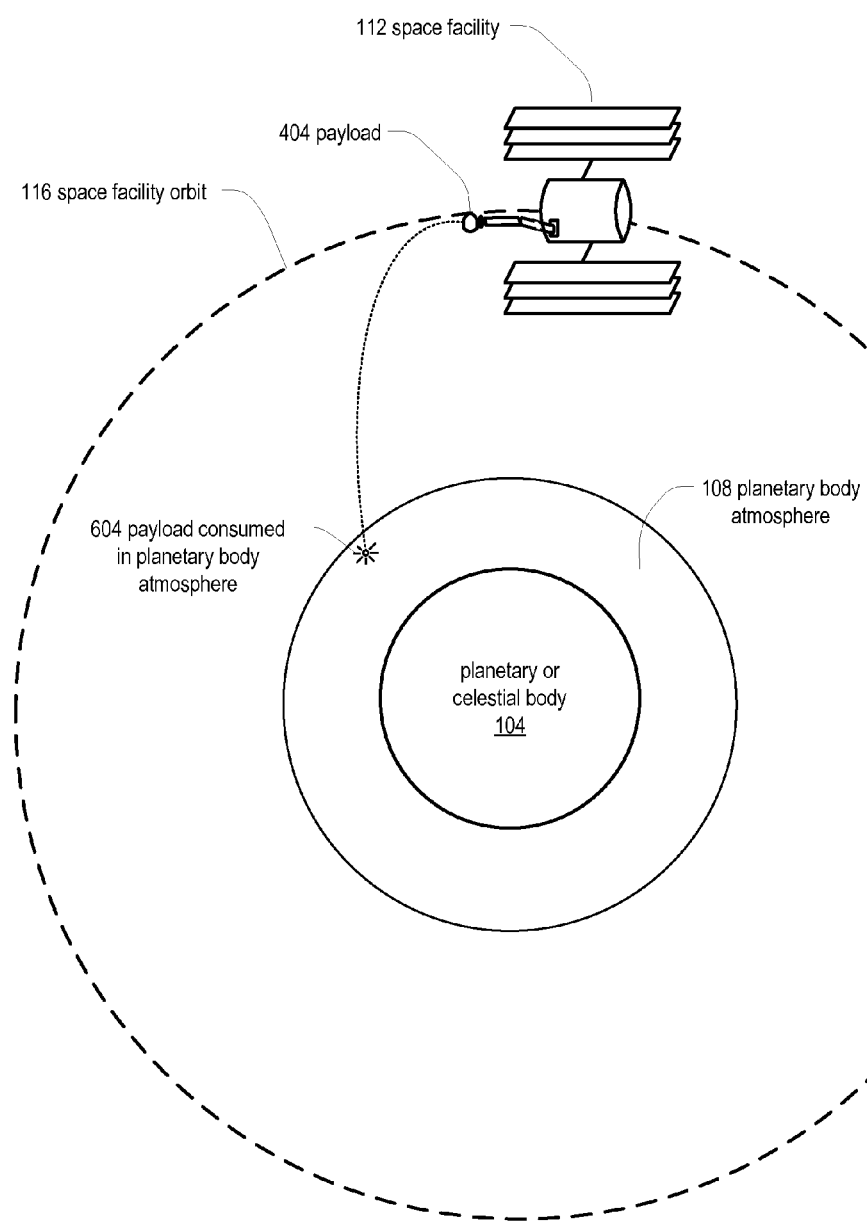

Fig. 7  Space facility payload downmass
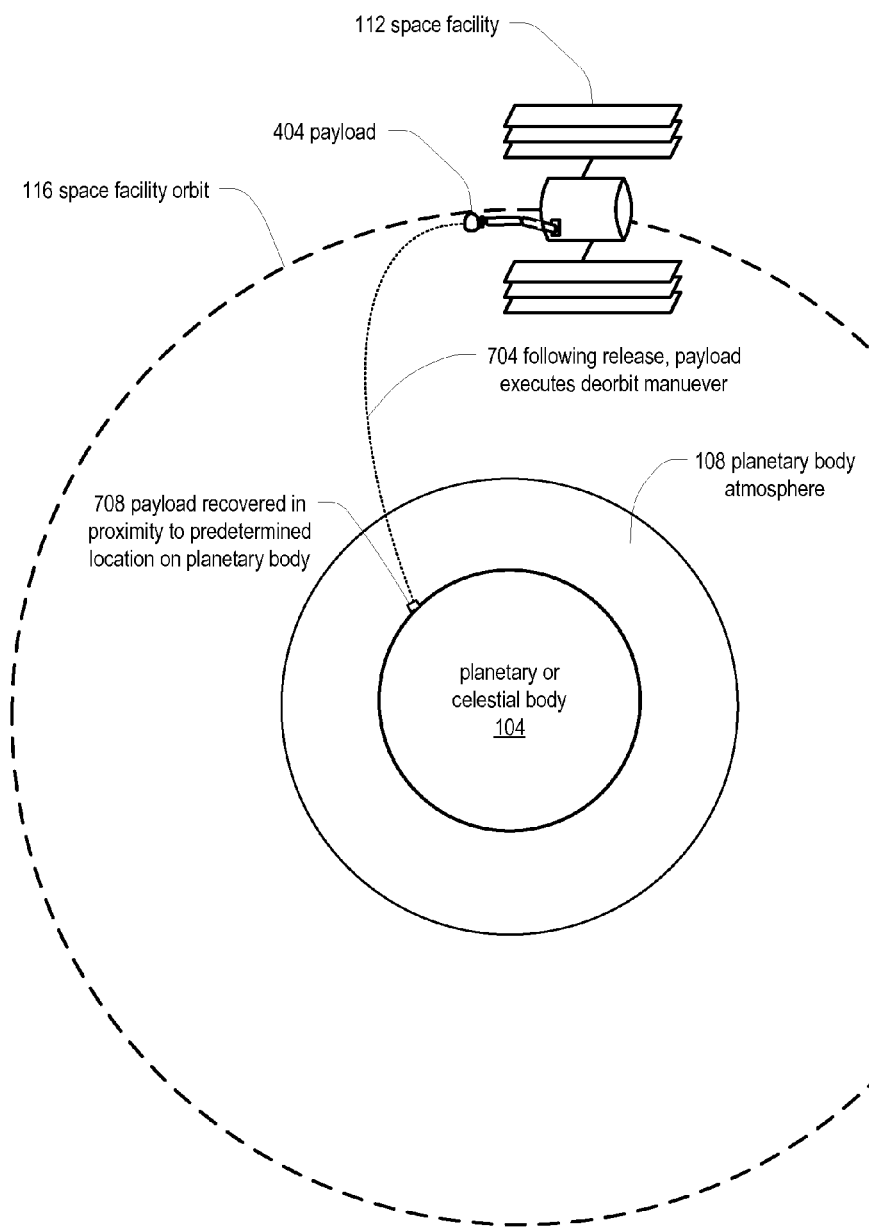

Fig. 8  Space facility payload deployment
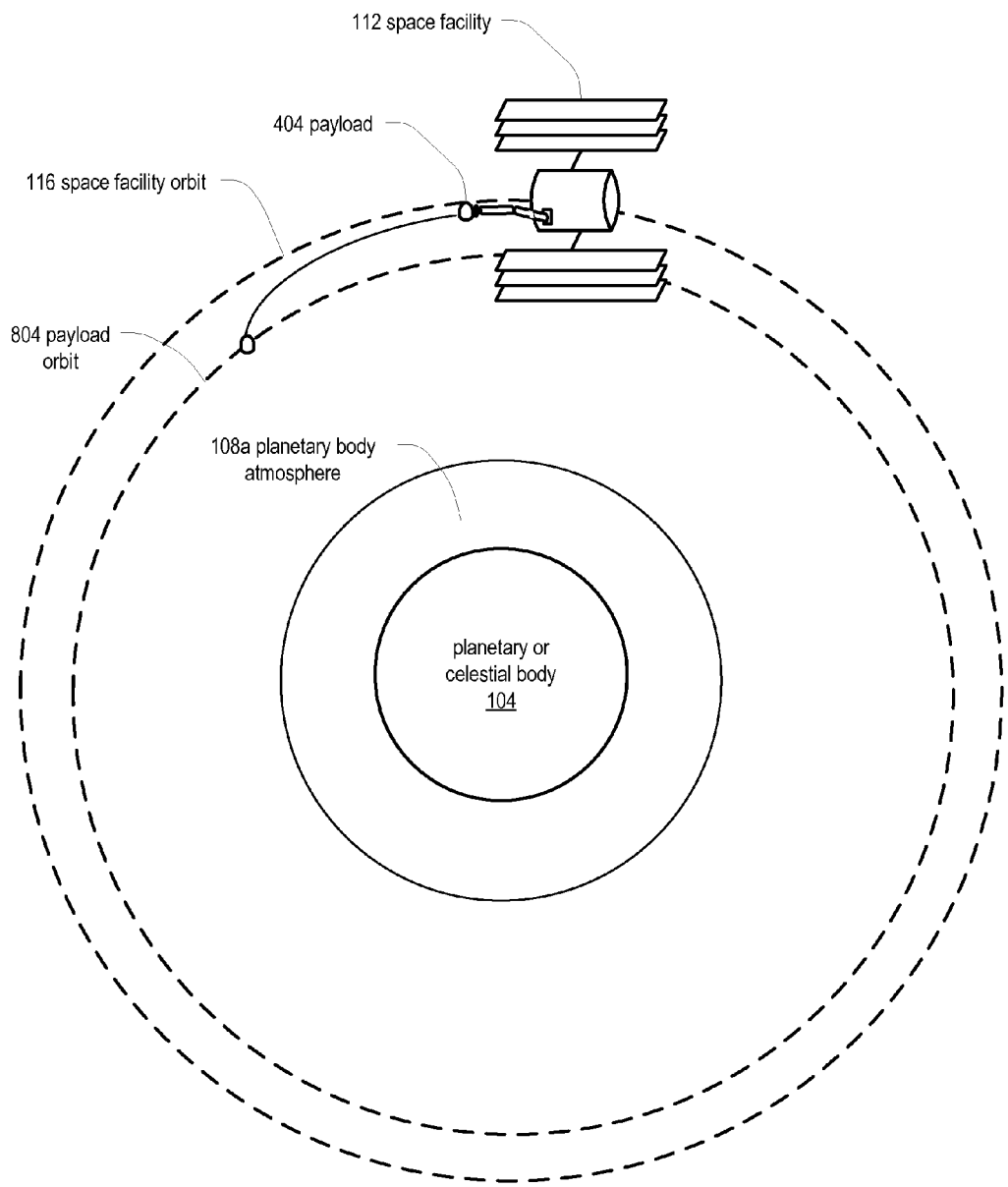

Fig. 9 *Space facility payload transfer*
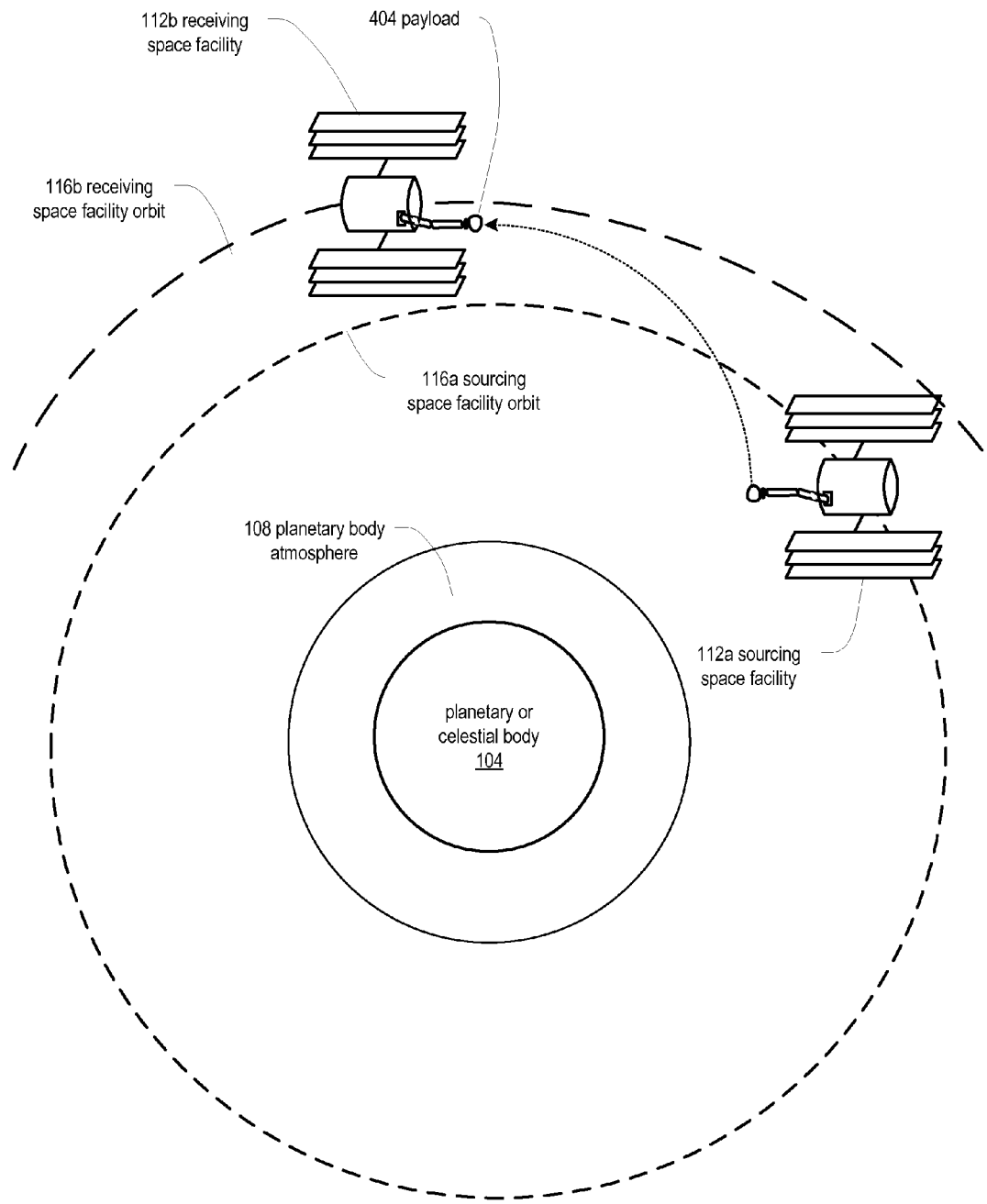

*Fig. 10 Space facility payload capture process*
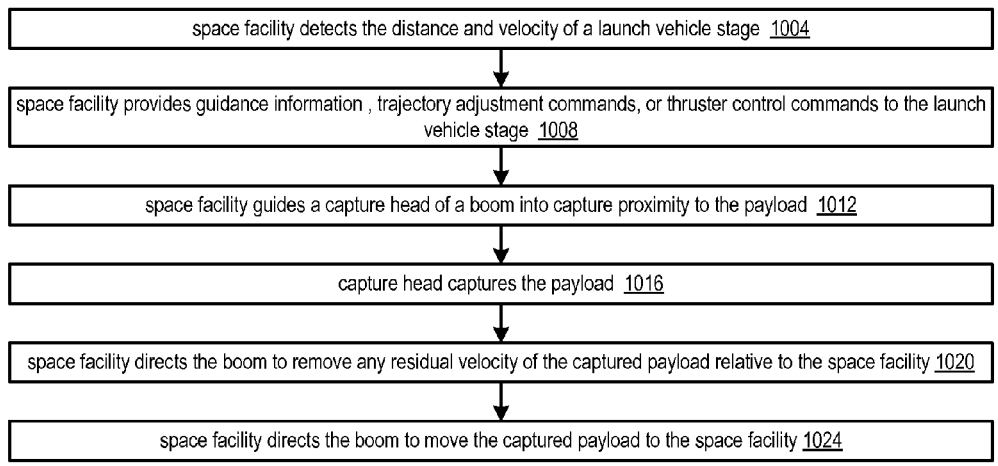

*Fig. 11a Space facility communication process, first embodiment*
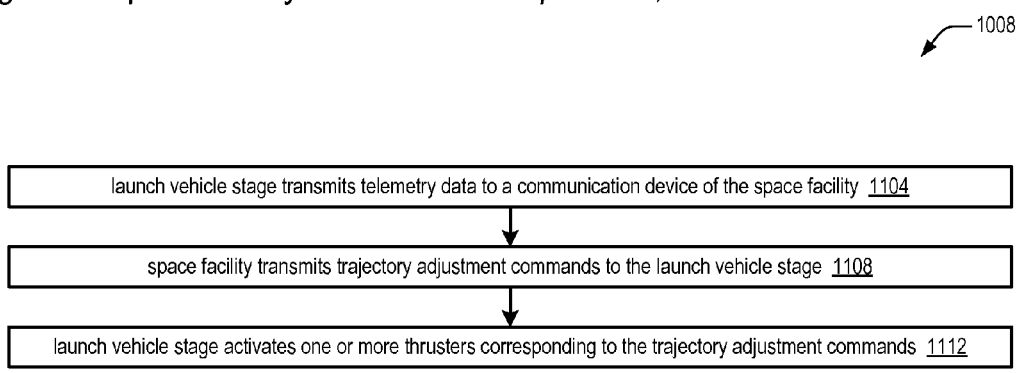
*Fig. 11b Space facility communication process, second embodiment*
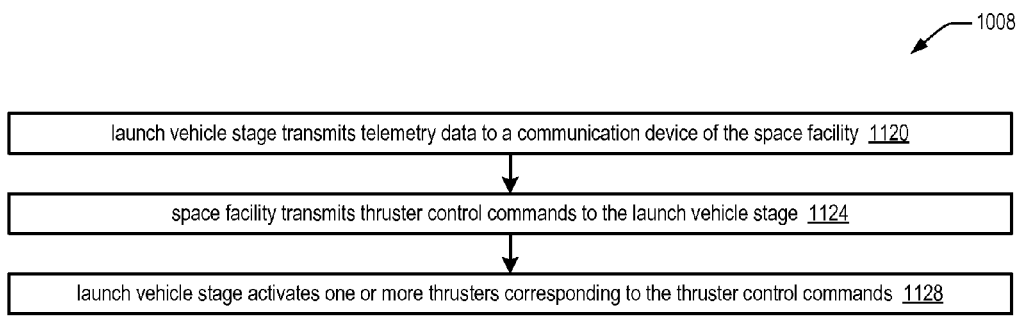

*Fig. 12 Space facility payload release process*
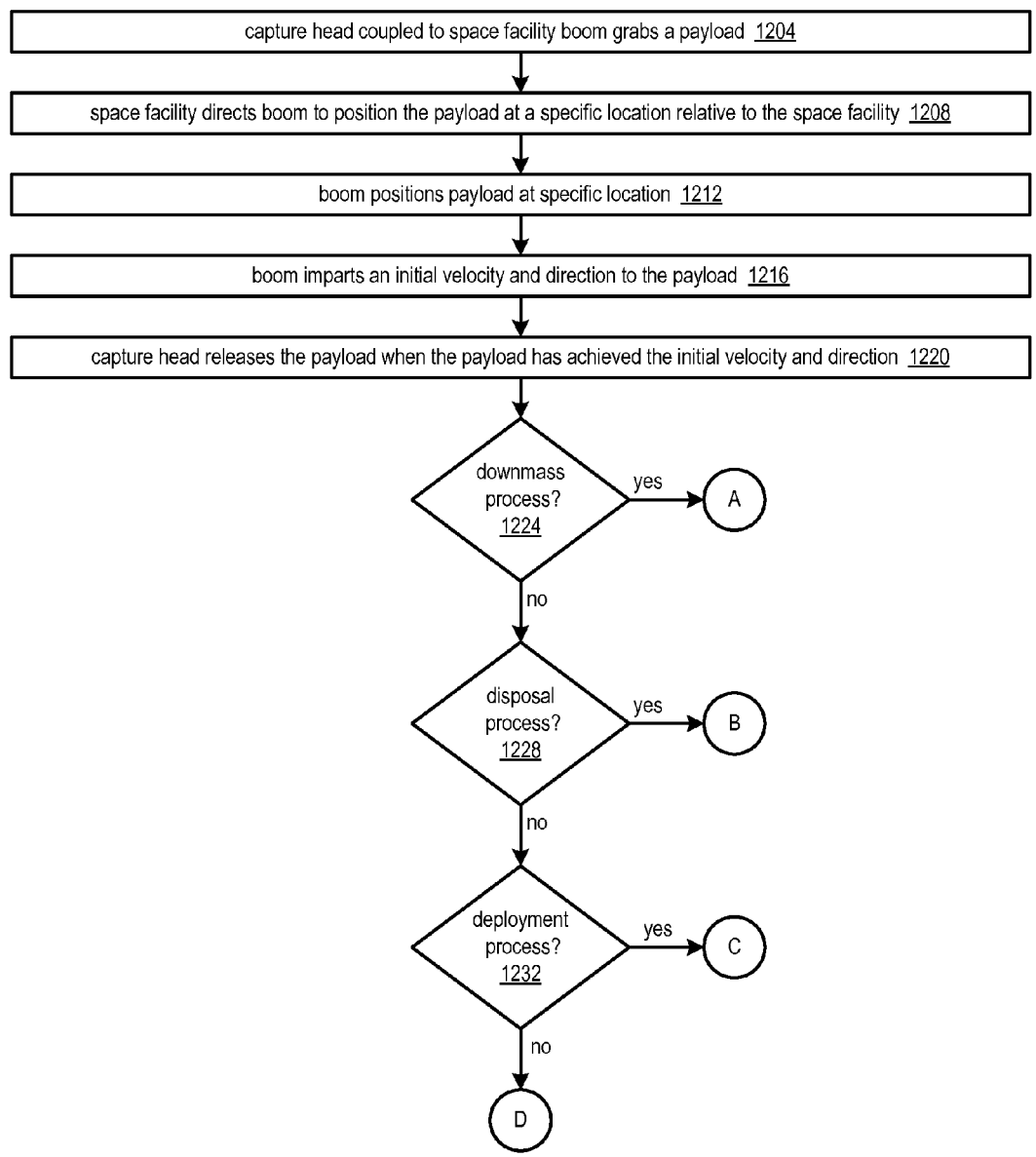

*Fig. 13a Downmass process*
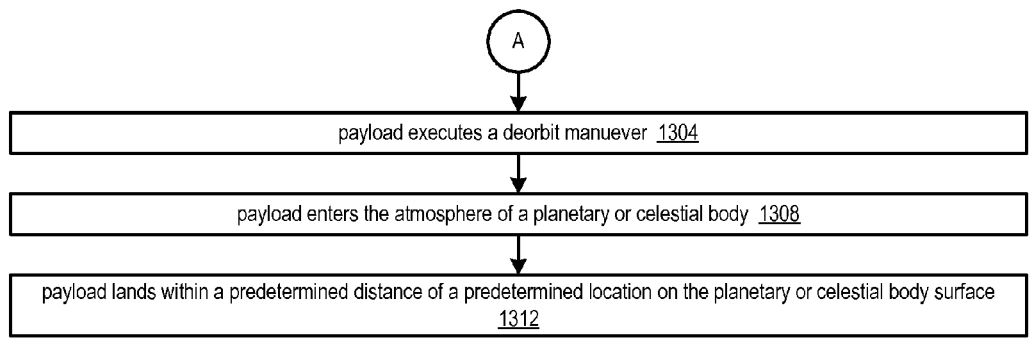
*Fig. 13b Disposal process*
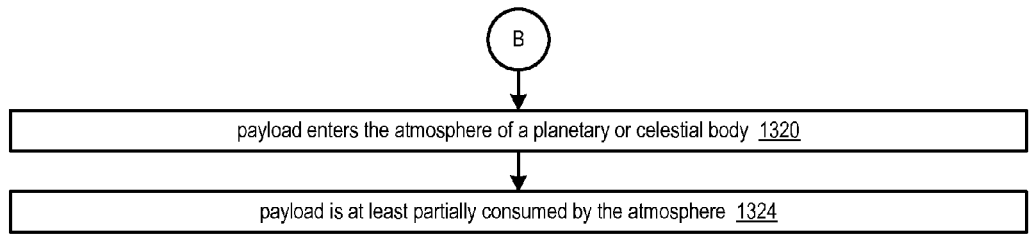
*Fig. 13c Deployment process*
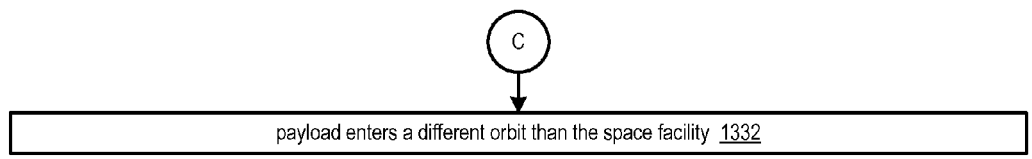
*Fig. 13d Transfer process*
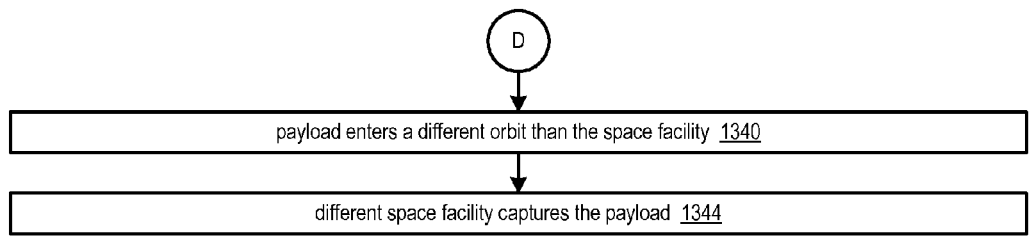

DIRECT TO FACILITY CAPTURE AND RELEASE

CROSS REFERENCE TO RELATED APPLICATIONS

This application claims priority and is a Continuation-in-Part of pending U.S. application Ser. No. 13/312,984, filed Dec. 6, 2011, entitled STICKY BOOM NON-COOPERATIVE CAPTURE DEVICE, which is hereby incorporated by reference for all purposes and which was owned or subject to an obligation of assignment to Altius Space Machines at the time the invention claimed herein was made. This application also claims priority from Provisional U.S. application Ser. No. 61/676,917, filed Jul. 28, 2012, entitled DIRECT TO STATION PAYLOAD RECOVERY AND DEPARTURE, which is hereby incorporated by reference for all purposes.

FIELD

The present invention is directed to object capture and release by a space facility. In particular, the present invention is directed to methods and apparatuses for capturing and releasing payloads by orbiting space facilities.

BACKGROUND

A space facility is a spacecraft, either one that is robotically operated or one capable of supporting a crew, which is designed to remain in space (most commonly in low Earth orbit) for an extended period of time, and to which other spacecraft or payloads can dock. A space facility is distinguished from other spacecraft used for human spaceflight by typically lacking major propulsion or landing systems. Instead, other vehicles transport people and cargo to and from space facilities. Currently, two manned space facilities are currently in orbit; the International Space Station (ISS), and China's Tiangong 1. Previous stations include the Almaz and Salyut series, Skylab, and most recently, Mir. Future space facilities may include the SpaceX Dragonlab and Bigelow aerospace Commercial Space Station.

Space facilities such as the ISS are typically used to study things such as the effects of long-term exposure to microgravity on the human body as well as to provide platforms for scientific studies and experiments involving the impact of the space environment on various physical, chemical, and biological processes, of a greater number and longer duration than is typically available on other types of space vehicles. Typically, space facilities have been designed with the intention of rotating multiple crews, with each crew member staying aboard the facility for weeks or months, but rarely more than a year. Since the ill-fated flight of Soyuz 11 to Salyut 1, all manned spaceflight duration records have been set aboard space facilities. The duration record for a single spaceflight is 437.7 days, set by Valeriy Polyakov aboard Mir from 1994 to 1995. As of 2011, three astronauts have completed single missions of over a year, all aboard Mir.

Space facilities often recover objects in space with one or more robotic arms. When the process involves recovering a delivery vehicle, it is typically called "berthing". Using a robot arm to recover a delivery vehicle and gently attach it to a space facility enables the use of lighter vehicle-to-vehicle connection mechanisms than is possible with traditional "docking" maneuvers, where the delivery vehicle directly connects with the space facility. A typical robotic arm is controlled by a computer by activating individual step motors or actuators connected at each joint. At a minimum, a robotic arm has a single segment and a joint at each end. Robotic arms often use motion sensors to regulate movement in precise increments.

Robotic arms have been in existence for several decades. Many industries utilize robotic arms to speed production, improve product assembly quality, and manipulate hazardous objects and materials. Most robotic arms in the world are designed for heavy, repetitive manufacturing work, and handle tasks that are difficult, dangerous, or boring to human beings.

Current technology robotic arms utilize capture heads incorporating mechanical grippers, where mechanical force between two or more surfaces are used to positively capture and move objects. Mechanical grippers are suitable to capture known objects of predictable size, shape, and orientation and having robust attachment surfaces.

SUMMARY

The present invention is directed to solving disadvantages of the prior art. In accordance with embodiments of the present invention, a method for delivering a payload to a space facility is provided. The method includes detecting, by the space facility, the relative position and velocity of a launch vehicle stage. The launch vehicle stage includes the payload and one or more thrusters. The method also includes providing, by the space facility, guidance information to the launch vehicle stage. The launch vehicle stage used for deliveries using the present invention does not need to include a relative navigation system, which such stages of the conventional art typically possess. In response to receiving the guidance information from the space facility, the method further includes activating, by the launch vehicle stage, one or more thrusters corresponding to the guidance information, and guiding a capture head of a boom into capture proximity to the payload. One end of the boom is coupled to the space facility and the other end of the boom is coupled to the capture head. The method also includes capturing, by the capture head, the payload, removing by the boom any residual relative velocity of the payload relative to the space facility, and moving, by the space facility, the captured payload to the space facility.

In accordance with another embodiment of the present invention, a method for launching a payload from an orbiting space facility is provided. The method includes grabbing, by a capture head, the payload. One end of a boom is coupled to the space facility and the other end of the boom is coupled to the capture head. The method also includes positioning, by the space facility, the payload at a specific location relative to the space facility, and imparting, by the boom, an initial velocity and direction to the payload. The space facility controls the boom and the capture head. The method further includes releasing, by the capture head, the payload when the payload has achieved the initial velocity and direction.

In accordance with a further embodiment of the present invention, an orbiting space facility for launching a payload is provided. The orbiting space facility includes a boom. The boom includes a capture head. The capture head is attached to one end of the boom and the space facility is attached to the other end of the boom. The capture head grabs the payload, and the space facility positions the payload at a specific location relative to the space facility. The space facility controls the boom and capture head to impart an initial velocity and direction to the payload. The capture head releases the payload when the payload has achieved the initial velocity and direction.

An advantage of the present invention is that it provides a method for recovering simple payloads by a space facility.

The payload is not required to have sophisticated navigation apparatuses, fine attitude control, or proximity sensors and control functions. The boom of the present invention is able to recover any practical payload, and if the capture head is a non-cooperative capture head, even payloads without dedicated attachment points or surfaces.

Yet another advantage of the present invention is it provides a method for space facilities to release or launch payloads without the use of a propulsive stage with relative navigation and maneuvering systems capable of precision maneuvers near the space facility. Payloads may be released to approach the surface of a planetary body or be consumed in a planetary body atmosphere (disposal), released/launched to return in proximity to a predetermined location on a planetary body (downmass), released/launched to a different orbit than the releasing/launching space facility (deployment), or released/launched to a different space facility (transfer).

Additional features and advantages of embodiments of the present invention will become more readily apparent from the following description, particularly when taken together with the accompanying drawings.

BRIEF DESCRIPTION OF THE DRAWINGS

FIG. 1 is a diagram illustrating a space facility orbit in accordance with embodiments of the present invention.

FIG. 2 is a diagram illustrating a space facility exclusion zone in accordance with embodiments of the present invention.

FIG. 3 is a block diagram illustrating a space facility communication device and detection device in accordance with embodiments of the present invention.

FIG. 4a is a diagram illustrating a launch vehicle stage in accordance with embodiments of the present invention.

FIG. 4b is an illustration depicting a payload in accordance with embodiments of the present invention.

FIG. 5a is an illustration depicting a space facility and boom in accordance with embodiments of the present invention.

FIG. 5b is an illustration depicting a boom in accordance with embodiments of the present invention.

FIG. 6 is an illustration depicting space facility payload disposal in accordance with embodiments of the present invention.

FIG. 7 is an illustration depicting space facility payload downmass in accordance with embodiments of the present invention.

FIG. 8 is an illustration depicting space facility payload deployment in accordance with embodiments of the present invention.

FIG. 9 is an illustration depicting space facility payload transfer in accordance with embodiments of the present invention.

FIG. 10 is a flowchart illustrating a space facility payload capture process in accordance with embodiments of the present invention.

FIG. 11a is a flowchart illustrating a first embodiment of a space facility communication process in accordance with the present invention.

FIG. 11b is a flowchart illustrating a second embodiment of a space facility communication process in accordance with the present invention.

FIG. 12 is a flowchart illustrating a space facility payload release process in accordance with the present invention.

FIG. 13a is a flowchart illustrating a downmass process in accordance with embodiments of the present invention.

FIG. 13b is a flowchart illustrating a disposal process in accordance with embodiments of the present invention.

FIG. 13c is a flowchart illustrating a deployment process in accordance with embodiments of the present invention.

FIG. 13d is a flowchart illustrating a transfer process in accordance with embodiments of the present invention.

DETAILED DESCRIPTION

Rocket upper stages generally must have pitch, roll, and yaw control along with coarse navigation just to get into the proper orbit. They also typically have some translation capability in the forward axial direction provided by the main engine(s), and secondary or reaction control system engines. However, these upper stages typically lack the fully-redundant six degree of freedom control and relative navigation capabilities normally required to safely approach to or depart from a space facility. Traditionally, in order to deliver payloads to an orbiting space facility, an additional delivery vehicle has been necessary, which has the precision relative navigation and maneuvering capabilities needed to safely approach and dock or berth with the space facility. These delivery vehicles, such as the Russian Soyuz or Progress spacecraft or the SpaceX Dragon spacecraft, are typically very expensive, and significantly reduce the amount of payload that a launch vehicle can deliver to a space facility compared to what it can deliver to the same orbit as the space facility.

One objective of the present invention is to enable orbiting space facilities to utilize these less-sophisticated rocket upper stages themselves to make safe deliveries and retrieve payloads to and from space facilities, without the need for an additional delivery/departure vehicle. The more sophisticated intelligence, fine control, proximity operations, and docking capabilities would be located in the space facility itself, rather than on the upper stage or approaching space vehicle.

The space facility release or departure solution involves a mechanism utilizing a long boom to "fling" something away (departure) from an orbital space facility, whether "downmass" (return to Earth for beneficial analysis or use), or "deploy" (placing it into a somewhat different safe low-Earth orbit (LEO) including to a different orbit than a low-Earth orbit, or "disposal" (a departure intended to burn up in the atmospheric reentry, such as for waste disposal), or "transfer" (placing it in a trajectory that will allow it to pass close enough to another space facility with similar capture/release system to capture it without the need to expend any propellants).

This may allow a low-cost vehicle to cost-effectively deliver propellant to an orbiting propellant depot, or a usable payload to a space facility. Rather than using a large and inefficient capsule such as the SpaceX Dragon capsule with six degree of freedom (DOF) control suitable for proximity operations, the rocket upper stage could be used, eliminating the additional cost and expense of the capsule. For delivery of small, individual payloads, it is generally not feasible to scale down a sophisticated vehicle such as Dragon, since the requisite proximity control functions alone are larger than many such small payloads.

Large launch vehicles also have the problem of requiring well-in-advance scheduling due to launch cost and complexity, which makes just-in-time payload delivery difficult if not impossible. A typical cargo delivery system is sized to carry a large number of smaller payloads, and these smaller payloads need to wait for a sufficient mass or quantity of other payloads to be "manifested" to fill the entire cargo vehicle before the launch. For example, it would be economically unattractive to use a 6000 lb capacity capsule at $130M per flight to carry a single 50 lb payload. Additionally, the orbit such a large vehicle is launched into may be different and less desirable than the orbit desired by a given small payload owner.

Boom technology forms a key innovative technology for the start of a space facility mass-release process, which could also facilitate a midterm re-entry and removal of space debris; or, with the addition of a very small amount of additional deceleration and a (still small) re-entry thermal protection system, could result in closely-timed and geographically-targeted re-entry that could facilitate getting a downmass payload delivered to an on-Earth lab or manufacturing facility within hours of a space facility departure maneuver. Although Sticky Boom technology represents the preferred embodiment of space facility capture and release operations, other conventional booms and end-effectors, including robotic force closure end-effectors, could be used, as well.

What is needed to provide this sort of just-in-time delivery and departure capability is a way to enable low-cost nano (<~50 kg payload) or micro-sized (>~50 kg payload) launch vehicles to interface with orbiting space facilities. These vehicles are small enough that in many cases they can fly affordably with only one piece of payload, eliminating the delays due to manifesting a full payload bay. Nano or micro-sized launch vehicle deliveries to space facilities can be achieved by offloading the relative navigation, proximity control, and docking thruster commands to a space-facility based controller. The space facility includes a boom, and in preferred embodiments a Sticky Boom, to recover, capture, and deploy the launch vehicle upper stage and other payloads. In one embodiment, a container containing one or more payloads separates from the upper stage and is captured by the boom. In another embodiment, the boom recovers the upper stage containing the payload container, separates the payload container from the upper stage, discards the upper stage, and recovers the payload container containing the payload. The process of discarding the upper stage is within the scope of the invention "departure" solution, where the departure system places the upper stage in this case into a trajectory that safely departs from the space facility. The upper stage can then perform a disposal maneuver, or if the space facility is at a low enough altitude, the upper stage may be allowed to naturally reenter and burn-up in the planetary body atmosphere or at least approach the planetary body surface.

Referring now to FIG. 1, a diagram illustrating a space facility orbit 116 in accordance with embodiments of the present invention is shown. A space facility 112 is a manned or unmanned spacecraft that is in a temporary or permanent orbit 116 around a planetary or celestial body 104. Planetary or celestial body 104 includes planets, asteroids, or other masses that exert a gravitational force. In some embodiments, a planetary body atmosphere 108 is present around planetary or celestial body 104. However, in other embodiments a planetary body atmosphere 108 is not present. In some embodiments the space facility orbit 116 can be a Lagrange point around more than one planetary or celestial body 104, such as the Earth-Moon L1 or L2 Lagrange points.

Referring now to FIG. 2, a diagram illustrating a space facility exclusion zone 204 in accordance with embodiments of the present invention is shown. Space facility exclusion zone(s) 204 are predetermined safety boundaries where extra safety and control requirements are often applied by the space facility operator to vehicles that need to maneuver inside the zone. For example, the International Space Station (ISS) has two exclusion zones 204—one a 200 meter radius "keep out sphere", and the other an "approach ellipsoid" of 2000 meter radius along the space facility orbit 116 axis and 1000 meter radius orthogonal to the space facility orbit 116 axis. For example, in the case of the International Space Station (ISS), there are specific safety requirements for a vehicle that wants to enter the approach ellipsoid, and there are even more stringent safety requirements for a vehicle that wants to enter the keep out sphere. If a capture were made outside of one or the other exclusion zone 204, the safety-imposed requirements would be reduced. In some embodiments, the space facility exclusion zone 204 is the same for payload capture and launch. In other embodiments, space facility exclusion zone 204 is different for payload capture and launch. For instance, in the case of the ISS, a system for launching non-maneuvering payloads is required to place the payloads on a trajectory that leaves the keep out sphere within 90 minutes of release.

Referring now to FIG. 3, a block diagram illustrating a space facility communication device 304 and detection device 312 in accordance with embodiments of the present invention is shown. Space facility communication device 304 is a wireless device that communicates with spacecraft upper stages or payloads. In some embodiments, communication device 304 communicates using radio frequency waves. In other embodiments, communication device 304 communicates optically or other frequencies other than radio waves. Communication device 304 communicates any of guidance information, telemetry data, trajectory adjustment commands, and thruster control commands 308 to and from spacecraft upper stages or payloads.

Space facility 112 also includes detection device 312, which detects the relative position and velocity, and in some embodiments proximity or a vehicle-unique identifier of one or more spacecraft upper stages or payloads. Detection device 312 interfaces with any devices capable of detecting spacecraft upper stage or payload relative position, velocity, and proximity. These devices include, but are not limited to, any combination of Radar 316, Camera 320, and/or Lidar 324 devices. In some embodiments, detection device 312 communicates with communication device 304 and receives relative position, velocity, or proximity information as part of telemetry data 308.

Referring now to FIG. 4a, a diagram illustrating a launch vehicle stage 412 in accordance with embodiments of the present invention is shown. Launch vehicle stage 412 in some embodiments is an upper stage of a larger launch vehicle launched from planetary or celestial body 104. In other embodiments, launch vehicle stage 412 is an orbiting spacecraft around planetary or celestial body 104. In yet other embodiments, launch vehicle stage 412 is a free-moving spacecraft not confined to any particular orbit 116.

Launch vehicle stage 412 includes one or more thrusters 408a that propel launch vehicle stage 412 in a predetermined direction with a controllable velocity change compared to before the thruster was activated. Thrusters 408a include, but are not limited to, rockets, cold gas thrusters, inflatable aerodynamic decelerators, and electrodynamic tether systems. In some embodiments, thrusters 408a control roll, pitch, and yaw movement of launch vehicle stage 412. In some embodiments, thrusters 408a of launch vehicle stage 412 include one or more main engines 408b to provide a translation capability in the forward axial direction.

Launch vehicle stage 412 also includes a payload 404. Payload 404 includes tools, fuel, or supplies for space facility 112, one or more experiment packages, sensors, trash, or anything else either delivered to space facility 112 or launched from space facility 112. In some embodiments, payload 404 is launch vehicle stage 412. Payload 404 may or may not have thrusters 408a. When a payload 404 is near a space facility 112 in Low-Earth Orbit and has one or more thrusters 408a and is used in the payload 404 release or launch operation as described with respect to FIGS. 6-9, the thrusters 408a impart a change in velocity of approximately 60-100 meters/second in the direction opposite the space station 112 orbital velocity. This puts the payload 404 on a trajectory that will intersect with a planetary body atmosphere 108 within half an orbit, enabling the payload 404 to land within a short distance of a desired point on the planetary or celestial body 104 surface, or enabling more rapid burn-up of the disposed payload 404.

Launch vehicle stage 412 lacks sophisticated relative navigation systems in order to reduce cost of the launch vehicle stage 412. Relative navigation systems provide intelligence, fine control, proximity operations, and docking capabilities so the launch vehicle stage 412 of the conventional art can dock with a space facility 112, without further assistance from the space facility 112. Instead, space facility 112 of the present invention includes the more sophisticated capabilities and manages docking operations to and from the space facility 112. A lower cost launch vehicle stage 412 is more suitable to deliver small payloads 404, where delivery expenses can be too high if using a conventional higher cost launch vehicle stage or traditional delivery vehicle 412.

Referring now to FIG. 4b, an illustration depicting a payload 404 in accordance with embodiments of the present invention is shown. Payload 404 may include communication systems 432 and/or a propulsion system 428, although in some embodiments payload 404 includes no communication systems 432 or propulsion system 428. For example, a payload 404 that is trash to be disposed from space facility 112 would likely have neither a communication system 432 nor propulsion system 428. However, in some embodiments, a payload 404 that needs guaranteed rapid disposal may include a propulsion system 428 and/or a communication system 432.

Communication system 432 is a wireless device that communicates with space facility 112. In some embodiments, communication system 432 communicates using radio frequency waves. In other embodiments, communication system 432 communicates optically or with communication technologies other than radio waves. Communication system 432 communicates with communication device 304 any of guidance information, telemetry data, trajectory adjustment commands, and thruster control commands 308 to and from space facility 112. Within payload 404, communication system 432 communicates with propulsion system 428.

Propulsion system 428 includes control systems 416 and one or more thrusters 408a, 408b. Control systems 416 include computers and circuits that convert commands from communication systems 432 into thruster commands 420 to the one or more thrusters 408. In some embodiments, the main engines 408b use a pressurized gas purge system 440 for clearing out unburned propellants between firings, and which can be used to allow a main engine 408b to operate as though it were a much lower-thrust cold gas thruster, enabling very small vehicle velocity changes without additional precision translation thrusters 408a. Thruster commands 420 also control operation of the pressurized gas purge system 440, if present. In some embodiments, payload 404 includes communication systems 432, but not propulsion system 428.

In some embodiments, payload 404 includes a thermal protection system 424. Thermal protection system 424 provides thermal shielding for payload 404 to protect the payload contents from re-entry to a planetary body atmosphere 108. For downmass payloads 404, the payload 404 is released or launched from space facility 112 and ultimately lands on the surface of planetary or celestial body 104, as described with respect to FIG. 7.

In some embodiments, payload 404 includes one or more landing systems 436 to assist in recovery of the payload 404. Landing systems 436 include, but are not limited to, parachutes, landing thrusters, wings, and helicopter blades.

Although not illustrated in FIG. 4b, it should be generally understood that payload 404 may include various items generally understood to be a "payload", including, but not limited to, experiments, fuel, food, water, trash, or other supplies.

Referring now to FIG. 5a, an illustration depicting a space facility 112 and boom 504 in accordance with embodiments of the present invention is shown. Space facility 112 may be in any configuration, but generally orbits around planetary or celestial body 104. Space facility 112 includes one or more booms 504, which are described in more detail with respect to FIG. 5b.

Boom 504 captures payloads 404 within the range of boom 504. Once a payload 404 is captured by boom 504, boom 504 moves the payload 404 to the space facility 112, for example to an airlock where space facility 112 personnel or robotic equipment can receive the payload 404. The payload 404 may be delivered from a launch vehicle stage 412 or transferred from another space facility 112. The boom 504 may also capture a payload 404 from the space facility 112 and either release or launch the payload 404, as described with respect to FIGS. 6-9.

Referring now to FIG. 5b, an illustration depicting a boom 504 in accordance with embodiments of the present invention is shown. One end of boom 504 is coupled to space facility 112, and the other end of boom 504 is coupled to a capture head 516. Boom 504 may have a single fixed segment or multiple segments, and each segment may be of variable or fixed length. For example, variable length segments may telescope to shorter or longer lengths. Boom 504 may also have joints between space facility 112, boom segments, and capture head 516 that allow or limit movement in specific directions. In preferred embodiments, boom 504 is a sticky boom, as described in pending U.S. application Ser. No. 13/312,984, filed Dec. 6, 2011, entitled Sticky Boom Non-Cooperative Capture Device, which is incorporated herein by reference. Although boom 504 may be of any configuration, the discussion following assumes a multiple segment sticky boom 504.

The multiple segment sticky boom 504 includes a plurality of boom segments, including at least boom segment 504a and boom segment 504b. In other embodiments, the multiple segment sticky boom 504 has more than two boom segments 504a, 504b. Each boom segment 504a, 504b includes a boom deployer 508, with boom deployer 508a in boom segment 504a and boom deployer 508b in boom segment 504b. Each boom segment 504 is able to move independently of any other boom segment 504.

For downmass or disposal operations, a 5-25 meter boom 504 should be sufficient for many applications. However, for capture operations it may be desirable to have a longer boom 504 to capture payloads 404 further from space facility 112. For example, for capturing small payloads 404 at the International Space Station it may be desirable to use a 200 meter or longer boom 504. This would allow payloads 404 to be captured completely outside of the inner space facilities exclusion zone 204 (the Keep Out Sphere). This would enable the payload 404 to avoid some of the safety requirements imposed on vehicles that are captured inside the Keep Out Sphere 204.

Each boom segment 504 is coupled to the space facility 112, another boom segment 504, or a capture head 516. Each of the couplings may be the same or a different type. In some embodiments, the couplings provide a similar degree of articulation as another form of robotic arm, or even a human arm (e.g. shoulder, elbow, wrist). Boom 504 is controlled by control apparatus 520 of space facility 112.

Capture head 516 makes contact with and captures payload 404. Once payload 404 is captured, boom 504 and capture head 516 moves the payload 404 to the space facility 112, or release/launches payload 404 to another location. In a preferred embodiment, capture head 516 utilizes sticky boom technology in order to non-cooperatively capture the payload 404. In other embodiments, other end effectors, including robotic force closure end effectors, are used for the capture head 516.

For payload 404 release or launch solutions, the invention does not utilize solutions such as one or more spring-loaded actuators in the capture head 516 of a relatively short boom 504 to impart an initial velocity to the payload 404. Instead, a longer boom 504 extends to a safe distance from the space facility 112 (5-200 meters+) and then imparts a known velocity vector as the boom's capture head 516 releases the payload 404 by translating the boom 504 prior to release. For example, for a departure system for the International Space Station, imparting a release velocity with a 25 cm/sec release velocity in a direction opposite of the direction of flight of the space facility 112 will put a payload 404 outside the space facility's 112 exclusion zone 204 in approximately 30 minutes, and such a payload 404 could return to a predetermined location on Earth 708 within about 90 minutes of departure from the orbiting space facility 112.

Referring now to FIG. 6, an illustration depicting space facility payload 404 disposal in accordance with embodiments of the present invention is shown. Space facility payload 404 disposal is releasing a payload 404 from the space facility 112 such that the payload 404 is consumed in the planetary body atmosphere 604. Space facility payload 404 disposal is used for disposing of payloads 404 that are not required to be reused again. Disposal would be the preferred way of dealing with space facility 112 trash, for example. When used for disposal, payload 404 may not have a communications system 432 or a propulsion system 428, although either a communication system 432 or a propulsion system 428 may be present. For example, a propulsion system 428 may be desirable to move the payload 404 rapidly away from the space facility 112, or move the payload 404 to a specific path such that the payload 404 would not impact in a populated area of the planetary or celestial body 104 if the payload 404 is not fully consumed in the planetary body atmosphere 108. When used for disposal, payload 404 would not have a thermal protection system 424 since that would mitigate the payload consumed in the planetary body atmosphere 604.

Referring now to FIG. 7, an illustration depicting space facility payload 404 downmass in accordance with embodiments of the present invention is shown. Space facility payload 404 downmass is a process by which a payload 404 is safely returned in proximity to a predetermined location on the planetary or celestial body 104. Downmass is used when the payload 404 is valuable and the payload 404 needs to survive reentry, including through the planetary body atmosphere 108.

Downmass is useful for physical samples (materials, biological, medical, etc.) processed in microgravity, and reduces the amount of specialized storage, including refrigeration and freezers, that is required on space facilities 112. Such samples currently need to wait for a reentry-capable space capsule to fill up with payloads 404 to take them back to Earth 104. This waiting period can easily reach several weeks or months, and in any case, certain samples may not remain viable long enough for a return opportunity with existing systems. This downmass solution would enable sending payloads 404 down one-at-a-time, without having to wait to for a larger capsule to be filled, enabling just-in-time return services from a space facility 112. In addition to physical samples, downmass capabilities can also be used to send space facility 112 hardware and experimental hardware down for periodic upgrade or repair, and for other uses, many of which could benefit from just-in-time return opportunities. Also, the downmass capacity of a complex space capsule may be very limited (Soyuz, for example) or a given payload 404 may not have high enough priority to return in a space capsule (SpaceX Dragon, for example), even if a given launch vehicle is already available.

Once the payload 404 has been released by the space facility 112, the payload executes a deorbit maneuver 704. The deorbit maneuver 704 is movement executed by the released payload 404 such that the payload 404 enters the planetary body atmosphere 108 at a predetermined location, and continues on a trajectory where the payload is recovered in proximity to a predetermined location on the planetary body 708. Execution of the deorbit maneuver 704 requires a propulsion system 428 in the payload 404, along with a communication system 432 to communicate with the space facility 112. The propulsion system 428 typically provides a small amount of deceleration relative to the space facility 112, resulting in a closely-timed and geographically-targeted re-entry that could facilitate getting a downmass payload 404 delivered to an on-Earth lab or manufacturing facility within hours of the space facility 112 payload downmass maneuver. The propulsion system 428 may include, but is not limited to any of liquid rocket engines, cold gas thrusters, hybrid rocket motors, electrodynamic tethers, or variable geometry aerodynamic drag devices. Payload 404 also requires a thermal protection system 424 in order to survive reentry through the planetary body atmosphere 108. In some embodiments, payload 404 includes one or more landing systems 436 to assist in recovery of the payload 404.

Referring now to FIG. 8, an illustration depicting space facility payload 404 deployment in accordance with embodiments of the present invention is shown. Deployment is a process by which a payload 404 moves from the space facility orbit 116 to a different payload orbit 804. Deployment may be used for example, when the payload 404 is a satellite. Depending on the payload orbit 804, payload 404 may require either a communication system 432, a propulsion system 428, or both. However, deployment would not require a thermal protection system 424, unless it was desired at some time in the future to recover the payload 404 as a downmass payload. In that case, payload 404 would require a communication system 432 and propulsion system 428 in order to receive the commands required to execute a deorbit maneuver, as described with respect to FIG. 7. In the case of payloads 404 deployed from the space facility 112, using this method enables placing the payload 404 into an orbit that will not intersect the space facility orbit 116 after release or during maneuvers to the final payload orbit 804. For example, a satellite 404 deployed from the ISS could be released above the station 112 in an orbit whose perigee is above the ISS orbit 116, enabling the satellite 404 to be deployed to a higher altitude orbit without having to propulsively cross the ISS orbit 116, thus greatly reducing the risk to the ISS of the deployment.

Referring now to FIG. 9, an illustration depicting space facility payload 404 transfer in accordance with embodiments of the present invention is shown. Space facility payload 404 transfer is a process whereby a payload 404 is launched or released from a sourcing space facility 112a to a receiving space facility 112b. The sourcing space facility 112a is in a sourcing space facility orbit 116a, and the receiving space facility 112b is in a receiving space facility orbit 116b. In some embodiments, the sourcing space facility orbit 116a is the same as the receiving space facility orbit 116b. In other embodiments, the sourcing space facility orbit 116a is different than the receiving space facility orbit 116b. Payload 404 may require a communication system 432, a propulsion system 428, or both. However, payload 404 transfer would not require a thermal protection system 424.

In the preferred embodiment of payload 404 transfer, both the sourcing space facility 112a and the receiving space facility 112b have the delivery and departure capabilities of the present invention. Therefore, the payload 404 lacks any relative navigation capabilities itself, and depends on the space facility 112a, 112b for payload 404 capture, launch, detection, and movement. In some embodiments, this removes the requirement for payload 404 to have either a propulsion system 428 or a communication system 432.

Referring now to FIG. 10, a flowchart illustrating a space facility payload 404 capture process in accordance with embodiments of the present invention is shown. Flow begins at block 1004.

At block 1004, the space facility 112 detects the distance and velocity of a launch vehicle stage 412. In one embodiment, the space facility 112 utilizes the detection device 312 to detect the distance and velocity of the launch vehicle stage 412. In a second embodiment, the space facility 112 utilizes the communication device 304 to obtain telemetry data 308 from the launch vehicle stage 412. Flow proceeds to block 1008.

At block 1008, the space facility 112 provides guidance information, trajectory commands, or thruster control commands 308 to the launch vehicle stage 412. Trajectory commands 308 are converted by control systems 416 of the payload 404 into thruster commands 420. Thruster control commands 308 allow the space facility 112 to directly control thrusters 408a of the payload 404. Thruster control commands 308 are passed through control systems 416 to thruster commands 420, without conversion. Flow proceeds to block 1012.

At block 1012, the space facility 112 guides a capture head 516 of a boom 504 into capture proximity to the payload 404. Capture proximity depends on the capture technology used in the capture head 516. For example, a capture head 516 using electromagnet technology may only need to be within a few centimeters of the payload 404, while a capture head 516 using electroadhesion technology would need to be within a few millimeters of the payload 404, and a capture head 516 using a resettable glue may need to be in physical contact with the payload 404. Flow proceeds to block 1016.

At block 1016, the capture head 516 captures the payload 404. Capturing the payload 404 means the capture head 516 has sufficient contact area and contact force to control the payload 404 so that its velocity relative to the space facility 112 can be safely removed and the payload 404 can then be moved by the boom 504. Flow proceeds to block 1020.

At block 1020, the space facility 112 directs the boom 504 to remove any residual velocity of the captured payload 404 relative to the space facility 112. This matches the relative velocity of the payload 404 to the space facility 112, thus allowing the boom 504 to move the payload 404 to the space facility 112. Flow proceeds to block 1024.

At block 1024, the space facility 112 directs the boom 504 to move the captured payload 404 to the space facility 112. In many embodiments, the captured payload 404 is moved to an airlock of the space facility 112. This will allow personnel or robotic systems of the space facility 112 to retrieve the payload 404. Flow ends at block 1024.

Referring now to FIG. 11a, a flowchart illustrating a first embodiment of a space facility communication process 1008 in accordance with the present invention is shown. Flow begins at block 1104.

At block 1104, the launch vehicle stage 412 transmits telemetry data 308 to a communication device 304 of the space facility 112. Telemetry data 308 provides velocity and direction information of the launch vehicle stage 412. Flow proceeds to block 1108.

At block 1108, the space facility 112 transmits trajectory adjustment commands 308 to the launch vehicle stage 412. Trajectory adjustment commands 308 describe velocity and direction changes the launch vehicle stage 412 needs to execute in order to move within capture proximity of the capture head 516 and boom 504. Flow proceeds to block 1112.

At block 1112, the launch vehicle stage 412 activates one or more thrusters 408a corresponding to the trajectory adjustment commands 308. Activating the one or more thrusters 408a causes the launch vehicle stage 412 to move toward the space facility 112, and specifically within the capture range of boom 504. Flow ends at block 1112.

Referring now to FIG. 11b, a flowchart illustrating a second embodiment of a space facility communication process 1008 in accordance with the present invention is shown. Flow begins at block 1120.

At block 1120, the launch vehicle stage 412 transmits telemetry data 308 to a communication device 304 of the space facility 112. Telemetry data 308 provides velocity and direction information of the launch vehicle stage 412. Flow proceeds to block 1124.

At block 1124, the space facility 112 transmits thruster control commands 308 to the launch vehicle stage 412. Thruster control commands 308 allow the space facility 112 to directly control thrusters 408a of the payload 404. Thruster control commands 308 are passed through control systems 416 to thruster commands 420, without conversion. Flow proceeds to block 1128.

At block 1128, the launch vehicle stage 412 activates one or more thrusters 408a corresponding to the thruster control commands 308. Activating the one or more thrusters 408a causes the launch vehicle stage 412 to move toward the space facility 112, and specifically within the capture range of boom 504. Flow ends at block 1128.

Referring now to FIG. 12, a flowchart illustrating a space facility payload 404 release process in accordance with the present invention is shown. Flow begins at block 1204.

At block 1204, the capture head 516 coupled to the space facility boom 504 grabs a payload 404. In one embodiment, the payload 404 has been previously released by the space facility 112 prior to the capture head 516 grabbing the payload 404. In another embodiment, the payload 404 is temporarily attached to the space facility 112 while the capture head 516 grabs the payload 404. Flow proceeds to block 1208.

At block 1208, the space facility 112 directs the boom 504 to position the payload 404 at a specific location relative to the space facility 112. A boom control apparatus 520 controls movement of the boom 504 to place the capture head 516 and payload 404 at a specific location, depending on what is to be done with the payload. Flow proceeds to block 1212.

At block 1212, the boom 504 positions the payload 404 at a specific location, relative to the space facility 112. In many embodiments, the payload 404 must be placed at least a predetermined distance 208 from the space facility 112. In some embodiments, the boom 504 and capture head 516 position the payload 404 in an initial position before imparting a velocity and direction to the payload 404. Flow proceeds to block 1216.

At block 1216, the boom 504 imparts an initial velocity and direction to the payload 404. The initial velocity and direction depends on what is being done with the payload 404, although in a preferred embodiment the payload 404 initial velocity is less than 1 meter/second. The initial velocity and direction causes the payload to move away from the space facility 112. In some embodiments, the payload 404 is released below the space facility 112 in an orbit closer to the planetary or celestial body 104 surface than the space facility orbit 116. In other embodiments, the payload 404 is released to an orbit that is further from the planetary or celestial body surface 104 than the space facility orbit 116. Flow proceeds to block 1220.

At block 1220, the capture head 516 releases the payload 404 when the payload 404 has achieved the initial velocity and direction. Releasing the payload 404 allows the payload 404 to move away from the capture head 516 and space facility 112. Flow proceeds to decision block 1224.

At decision block 1224, a determination is made if the current process is a downmass process. A downmass process is the process illustrated and described in FIG. 7. If the current process is a downmass process, the flow proceeds to block 1304 of FIG. 13a. If the current process is not a downmass process, the flow proceeds to decision block 1228.

At decision block 1228, a determination is made if the current process is a disposal process. A disposal process is the process illustrated and described in FIG. 6. If the current process is a disposal process, the flow proceeds to block 1320 of FIG. 13b. If the current process is not a disposal process, the flow proceeds to decision block 1232.

At decision block 1232, a determination is made if the current process is a deployment process. A deployment process is the process illustrated and described in FIG. 8. If the current process is a deployment process, the flow proceeds to block 1332 of FIG. 13c. If the current process is not a deployment process, then the current process is a transfer process and flow proceeds to block 1340 of FIG. 13d.

Although decision blocks 1224-1232 are illustrated in the order of initially determining if the current process is a downmass process, then a disposal process, then a deployment process, it is recognized by one of ordinary skill in the art that the process determination steps may be performed in any order, even in parallel, without deviating from the scope of the present invention.

Referring now to FIG. 13a, a flowchart illustrating a downmass process in accordance with embodiments of the present invention is shown. Flow begins at block 1304.

At block 1304, the payload 404 executes a deorbit manuever. The deorbit maneuver was previously discussed with respect to FIG. 7. Flow proceeds to block 1308.

At block 1308, the payload 404 enters a planetary body atmosphere 108. Flow proceeds to block 1312.

At block 1312, the payload 404 lands within a predetermined distance of a predetermined location on the planetary or celestial body 104 surface. Flow ends at block 1312.

Referring now to FIG. 13b, a flowchart illustrating a disposal process in accordance with embodiments of the present invention is shown. Flow begins at block 1320.

At block 1320, the payload 404 enters a planetary body atmosphere 108. Flow proceeds to block 1324.

At block 1324, the payload 404 is at least partially consumed by the planetary body atmosphere 108. However, where a planetary or celestial body 104 does not have a planetary body atmosphere 108, the payload 404 may not be at least partially consumed, and may instead impact the surface of the planetary or celestial body 104. Flow ends at block 1324.

Referring now to FIG. 13c, a flowchart illustrating a deployment process in accordance with embodiments of the present invention is shown. Flow begins at block 1332.

At block 1332, the payload 404 enters a different orbit 804 than the space facility orbit 116. Flow ends at block 1332.

Referring now to FIG. 13d, a flowchart illustrating a transfer process in accordance with embodiments of the present invention is shown. Flow begins at block 1340.

At block 1340, the payload 404 enters a different orbit 116b than the space facility orbit 116a. Flow proceeds to block 1344.

At block 1344, a different space facility 112b captures the payload 404. In some embodiments, the processes of FIGS. 10-11 are used by the receiving space facility 112b to capture the payload 404. Flow ends at block 1344.

For the transfer process of FIG. 13d, if both space facilities 112 have similar delivery/departure capability, payloads 404 may be passed back and forth without the payload 404 needing to have a propulsion system 428 and possibly also without a communication system 432. In such embodiments, the boom 504 places the payload 404 into a trajectory that needs no further participation from the payload 404 to get into a position where the other space facility 112 can capture it using its boom 504.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method for delivering a payload to a space facility, comprising:
   detecting, by the space facility, the relative position and velocity of a launch vehicle stage, the launch vehicle stage comprising the payload and one or more thrusters;
   providing, by the space facility, guidance information to the launch vehicle stage, wherein the launch vehicle stage does not include a relative navigation system;
   in response to receiving the guidance information from the space facility,
   activating, by the launch vehicle stage, the one or more thrusters corresponding to the guidance information;
   guiding, by the space facility, a capture head of a boom into capture proximity to the payload, wherein one end of the boom is coupled to the space facility and the other end of the boom is coupled to the capture head;
   capturing, by the capture head, the payload;
   removing, by the boom, any residual relative velocity of the payload relative to the space facility; and
   moving, by the boom, the captured payload to the space facility.

2. The method of claim 1, wherein the launch vehicle stage is the payload, wherein the payload comprises communications systems for receiving the guidance information, control systems to activate the one or more thrusters corresponding to the guidance information, and the one or more thrusters.

3. The method of claim 1, wherein the boom is a sticky boom, wherein the sticky boom allows non-cooperative capture of the payload.

4. The method of claim 1, wherein the space facility comprises a communication device to provide the guidance information to the launch vehicle stage, wherein the communication device receives telemetry data from the launch vehicle stage, wherein telemetry data comprises an estimate of at least one of the launch vehicle stage velocity, position, orientation, mass properties, and operational state, wherein the communication device transmits trajectory adjustment commands to the launch vehicle stage.

5. The method of claim 1, wherein the one or more thrusters comprises one or more main engines that use a pressurized gas purge system to allow the one or more main engines to operate as though it were a much lower thrust cold gas thruster, wherein much lower thrust cold gas thrusters enable very small launch vehicle stage velocity changes without additional thrusters.

6. The method of claim 1, wherein the space facility comprises a detection device, wherein the detection device comprises at least one of a Radar, a Lidar, visual cameras, and other devices that provide information about relative position, relative velocity, or a vehicle-unique identifier of the payload.

7. A method for launching a payload from an orbiting space facility, comprising:
grabbing, by a capture head, the payload, wherein one end of a boom is coupled to the space facility and the other end of the boom is coupled to the capture head, wherein the boom is a rigid structure extending between the capture head and the space facility;
positioning, by the space facility, the payload at a specific location relative to the space facility;
imparting, by the boom, an initial velocity and direction to the payload, wherein the space facility controls the boom and the capture head; and
releasing, by the capture head, the payload when the payload has achieved the initial velocity and direction.

8. The method of claim 7, wherein the boom is articulated to move the capture head within the extension range of the boom.

9. The method of claim 7, wherein positioning the payload at a specific location relative to the space facility comprising extending, by the space facility, the boom until the capture head is at a predetermined relative position and relative velocity from the space facility.

10. The method of claim 9, wherein after releasing the payload, the method further comprising:
executing a deorbit maneuver, by the payload, the payload comprising a propulsion system and a thermal protection system;
entering the atmosphere of a planetary body, by the payload, wherein the space facility orbits around the planetary body; and
landing within a predetermined distance from a predetermined location on the surface of the planetary body.

11. The method of claim 9, wherein after releasing the payload, the method further comprising:
entering the atmosphere of a planetary body, by the payload, wherein the space facility orbits around the planetary body.

12. The method of claim 9, wherein after releasing the payload by the capture head, the method further comprising:
entering, by the payload, a different orbit than the space facility orbit.

13. The method of claim 9, wherein after releasing the payload by the capture head, the method further comprising:
approaching, by the payload, a different space facility, wherein the different space facility captures the payload, the payload comprising at least one of a communication system and a propulsion system,
wherein the initial velocity and direction have been calculated to intercept the different space facility.

14. An orbiting space facility for launching a payload, comprising:
a boom comprising:
a capture head, wherein the capture head is attached to one end of the boom and the space facility is attached to the other end of the boom, wherein the boom is a rigid structure extending between the capture head and the space facility;
wherein the capture head grabs the payload, wherein the space facility positions the payload at a specific location relative to the space facility, wherein the space facility controls the boom and capture head to impart an initial velocity and direction to the payload, wherein the capture head releases the payload when the payload has achieved the initial velocity and direction.

15. The orbiting space facility of claim 14, wherein the boom is articulated to move the capture head within the extension range of the boom.

16. The orbiting space facility of claim 14, wherein the space facility positions the payload at a specific location relative to the space facility comprising the space facility extends the boom until the capture head is at a predetermined relative position and relative velocity from the space facility.

17. The orbiting space facility of claim 16, wherein after the capture head releases the payload, the payload executes a deorbit maneuver, enters the atmosphere of a planetary body, and lands within a predetermined distance from a predetermined location on the surface of the planetary body, wherein the space facility orbits around the planetary body, wherein the payload comprises a propulsion system and a thermal protection system.

18. The orbiting space facility of claim 16, wherein after the capture head releases the payload, the payload enters the atmosphere of a planetary body and the atmosphere at least partially consumes the payload, wherein the space facility orbits around the planetary body.

19. The orbiting space facility of claim 16, wherein after the capture head releases the payload, the payload enters a different orbit than the space facility orbit.

20. The orbiting space facility of claim 16, wherein after the capture head releases the payload, the payload approaches a different space facility, wherein the different space facility captures the payload, the payload comprising at least one of a communication device and a propulsion system, wherein the initial velocity and direction have been calculated to intercept the different space facility.

* * * * *